United States Patent
Matsui et al.

(10) Patent No.: US 9,609,158 B2
(45) Date of Patent: Mar. 28, 2017

(54) IMAGE FORMING DEVICE WITH PLATE PARTIONING REVERSE PATH AND BUFFER UNIT

(71) Applicant: Konica Minolta, Inc., Choyoda-ku, Tokyo (JP)

(72) Inventors: Masaki Matsui, Toyokawa (JP); Naoya Nakayama, Toyokawa (JP); Riichi Hama, Toyokawa (JP); Hidehito Kishi, Toyokawa (JP); Ryo Morita, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/855,801

(22) Filed: Sep. 16, 2015

(65) Prior Publication Data
US 2016/0080595 A1 Mar. 17, 2016

(30) Foreign Application Priority Data
Sep. 16, 2014 (JP) ................................. 2014-187472

(51) Int. Cl.
H04N 1/00 (2006.01)
H04N 1/32 (2006.01)

(52) U.S. Cl.
CPC ....... *H04N 1/00572* (2013.01); *H04N 1/0058* (2013.01); *H04N 1/00615* (2013.01);
(Continued)

(58) Field of Classification Search
CPC ............. H04N 1/00572; H04N 1/0058; H04N 1/00615; H04N 1/00657
(Continued)

(56) References Cited

U.S. PATENT DOCUMENTS

2014/0042695 A1* 2/2014 Maejima ................ B65H 29/14
271/314

FOREIGN PATENT DOCUMENTS

JP 08-337347 A 12/1996
JP 2001-316025 A 11/2001
(Continued)

OTHER PUBLICATIONS

Notification of Reasons for Refusal dated Sep. 27, 2016 issued in the corresponding Japanese Patent Application No. 2014-187472 and English translation (5 pages).

*Primary Examiner* — Jamares Q Washington
(74) *Attorney, Agent, or Firm* — Buchanan Ingersoll & Rooney PC

(57) ABSTRACT

An image forming device having a printer unit, a post-processing unit, and an eject tray. The printer unit forms images on recording sheets, and the post-processing unit performs processing on a recoding sheet stack composed of one or more recording sheets output from the printer unit before the recording sheet stack is ejected onto the eject tray. The image forming device includes: a buffer unit that, while a first recording sheet resides in the post-processing unit for the post-processing, holds a second recording sheet therein, the second recording sheet output from the printer unit subsequent to the first recording sheet; and a reverse path that reverses recording sheets when the image forming device performs duplex printing. In a plan view of the image forming device taken along a vertical direction, the post-processing unit, the buffer unit, and the reverse path at least partially cover one another.

12 Claims, 13 Drawing Sheets

(52) U.S. Cl.
CPC ....... *H04N 1/00657* (2013.01); *H04N 1/3248* (2013.01); *H04N 1/32363* (2013.01); *H04N 2201/0091* (2013.01); *H04N 2201/3288* (2013.01)

(58) Field of Classification Search
USPC ..... 358/3.32, 401; 399/16, 31, 66, 364, 373, 399/407
See application file for complete search history.

(56) References Cited

FOREIGN PATENT DOCUMENTS

| | | |
|---|---|---|
| JP | 2006-062877 A | 3/2006 |
| JP | 2006-096546 A | 4/2006 |
| JP | 2013-245080 A | 12/2013 |
| JP | 2014-152012 A | 8/2014 |

\* cited by examiner

IMAGE FORMING DEVICE WITH PLATE PARTIONING REVERSE PATH AND BUFFER UNIT

CROSS-REFERENCE TO RELATED APPLICATION

This application is based on application No. 2014-187472 filed in Japan, the contents of which are hereby incorporated by reference.

BACKGROUND (1) Technical Field

The present invention relates to image forming devices, and in particular, to a technology for providing an image forming device that achieves a duplex printing function, a small size, and high productivity all at the same time.

(2) Related Art

Typically, an image forming device such as a copy machine has a scanner unit and a printer unit that forms images on recording sheets. Further, in a specific type of image forming devices, the printer unit is located below the scanner unit with a space (referred to in the following as an in-body space) between the scanner unit and the printer unit, and recording sheets output from the printer unit are ejected within the in-body space before further processing. Such an image forming device is commonly referred to as an in-body paper-ejection type image forming device.

An in-body paper-ejection type image forming device may include a post-processing device that performs post-processing (e.g., stapling) with respect to stacks of recording sheets. Further, the post-processing device may be located within the in-body space. In such an image forming device, a recording sheet stack having undergone post-processing by the post-processing device may, for example, be eventually pushed out towards a tray (referred to in the following as a front tray) provided at the front side of the image forming device.

However, in such an image forming device, when a first recording sheet stack and a subsequent second recording sheet stack are to be continuously post-processed, the second sheet stack cannot be ejected to the in-body space while the first recording sheet stack is being post-processed and resides within the in-body space. Thus, image forming with respect to the second recording sheet is suspended until post-processing of the first recording sheet stack is completed and the first recording sheet stack no longer resides within the in-body space. This results in the image forming device having low productivity.

In view of this problem, conventional technology (for example, Japanese Patent Application Publication No. 2006-096546) proposes an image forming device that includes, along a path extending from a fixing unit to a post-processing tray, a buffer means for temporarily holding recording sheets. FIG. 13 exemplifies such an image forming device. Providing such a buffer means enables performing image forming with respect to recording sheets belonging to a recording sheet stack (i.e., prevents the suspension of image forming as described above), even when a previous recording sheet stack still resides on the post-processing tray. Thus, an in-body paper-ejection type image forming device with such a buffer means has higher productivity than a similar image forming device without such a buffer means.

However, in the image forming device pertaining to the conventional technology described above, the buffer means, the post-processing tray, and a first paper eject tray are disposed in the stated order along a transport path of recording sheets. Due to this, a recording sheet bearing an image travels a relatively long distance to reach the first paper eject tray. Thus, the image forming device has a large size.

In addition, the image forming device pertaining to the conventional technology described above includes a second paper eject tray that is separate from the first paper eject tray. The second paper eject tray is used in duplex printing and changes the transport direction of a recording sheet from a first transport direction to a second transport direction, in order to change the image-forming target side of the recording sheet. The image forming device, due to having two paper eject trays as described above, inevitably has a large size.

SUMMARY

In view of such problems, the present disclosure aims to provide an image forming devices that achieves a duplex printing function, a small size, and high productivity all at the same time.

In order to achieve such an aim, one aspect of the present disclosure is an image forming device having a printer unit, a post-processing unit, and an eject tray. The printer unit forms images on recording sheets, and the post-processing unit performs processing on a recoding sheet stack composed of one or more recording sheets output from the printer unit before the recording sheet stack is ejected onto the eject tray. The image forming device includes: a buffer unit that, while a first recording sheet resides in the post-processing unit for the post-processing, holds a second recording sheet therein, the second recording sheet output from the printer unit subsequent to the first recording sheet; and a reverse path that reverses recording sheets when the image forming device performs duplex printing. In a plan view of the image forming device taken along a vertical direction, the post-processing unit, the buffer unit, and the reverse path at least partially cover one another.

BRIEF DESCRIPTION OF THE DRAWINGS

These and other objects, advantages, and features of the technology pertaining to the present disclosure will become apparent from the following description thereof, taken in conjunction with the accompanying drawings illustrating a specific embodiment of the technology pertaining to the present disclosure.

In the drawings.

DESCRIPTION OF EMBODIMENT

The following describes an embodiment of the image forming device pertaining to the present disclosure, with reference to the accompanying drawings.

[1] Structure of Image Forming Device

The following describes the structure of an image forming device 1 pertaining to the embodiment.

Figure 1:
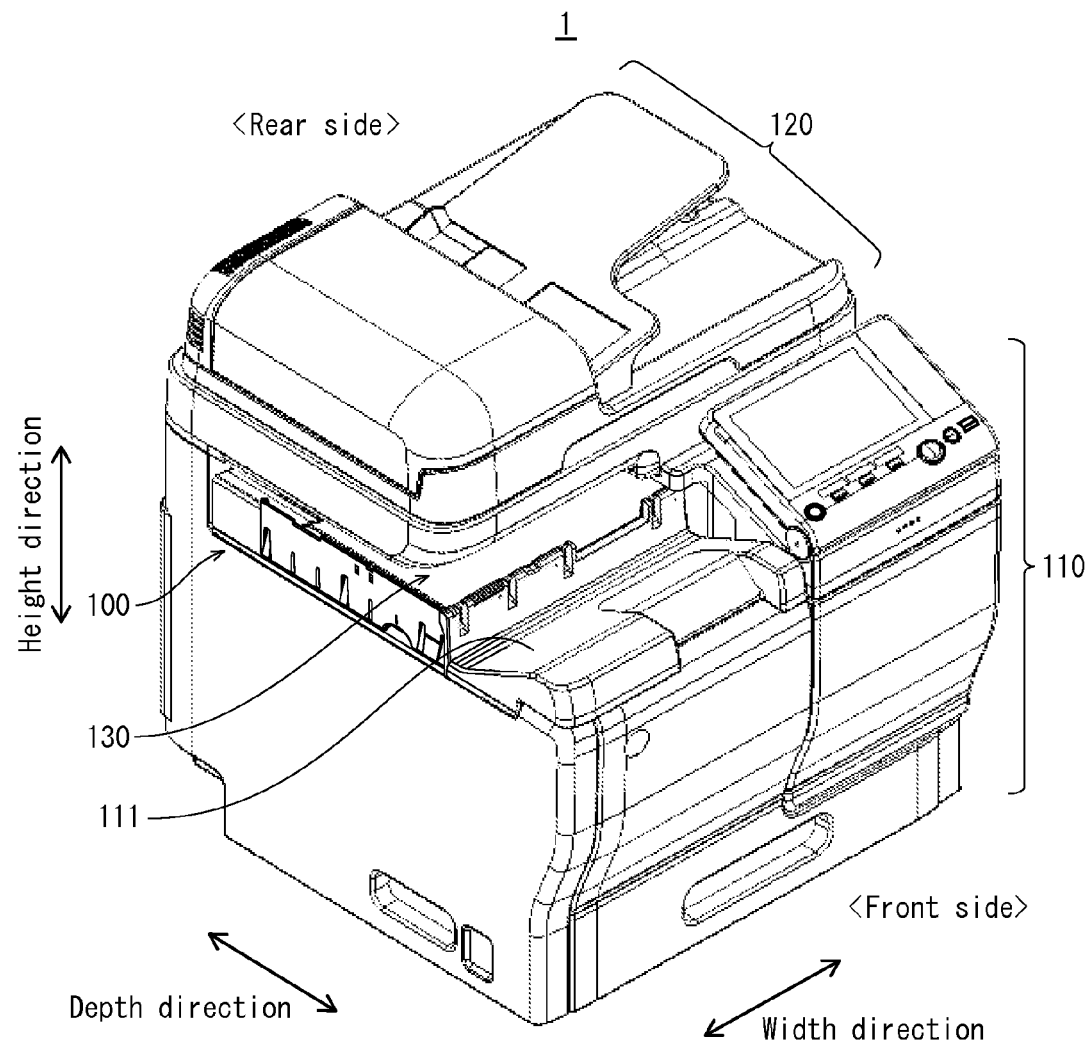
FIG. 1 is a perspective view illustrating the appearance of an image forming device pertaining to an embodiment, with illustration provided of major components of the image forming device.

FIG. 1 is a perspective view illustrating the appearance of the image forming device 1, with illustration provided of major components of the image forming device 1. As illustrated in FIG. 1, the image forming device 1 includes: a post-processing unit 100; a printer unit 110; and a scanner unit 120. The scanner unit 120 scans documents and generates image data. The printer unit 110 forms images on recording sheets based on image data. The image data may be the image data generated by the scanner unit 120 or image data received from other devices.

The image forming device 1 is an in-body paper-ejection type image forming device. The image forming device 1 has an in-body space 130 between the printer unit 110 and the scanner unit 120. The in-body space 130 is for receiving recording sheets ejected from the printer unit 110, which bear images formed by the printer unit 110. The printer unit 110 has a front tray 111 that is located at the front side of the image forming device 1. Recording sheets ejected by the printer part 110 into the in-body space 130, particularly above the post-processing unit 100, are eventually pushed out towards and on the front tray 111.

Due to the image forming device 1 having such a structure, recording sheets are discharged from the front side of the image forming device 1. Thus, the image forming device 1 requires smaller installation space in the lateral direction compared to image forming devices discharging recording sheets from lateral sides thereof.

Figure 2:
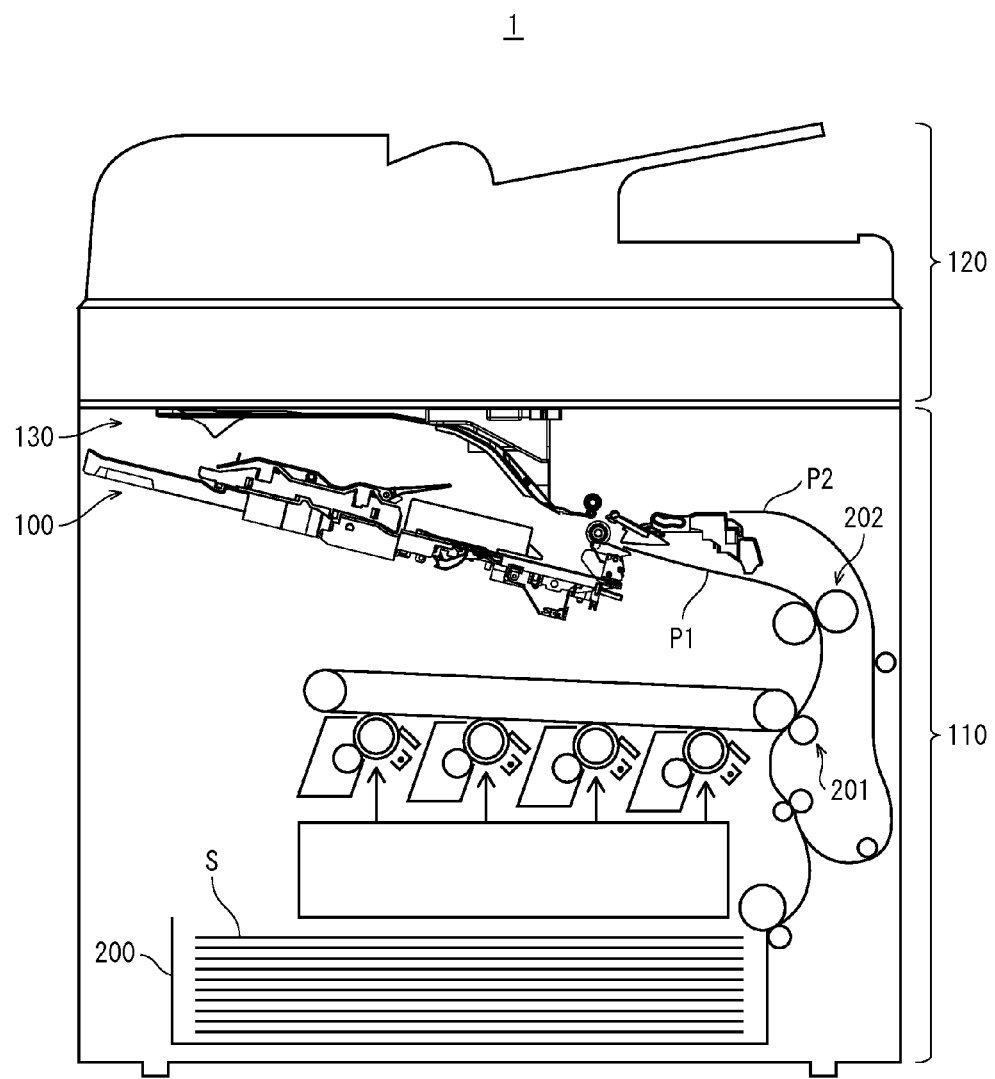
FIG. 2 is a cross-sectional view illustrating major components of the image forming device pertaining to the embodiment.

FIG. 2 is a cross-sectional view illustrating the major components of the image forming device 1. As illustrated in FIG. 2, the printer unit 110 is a so-called tandem-type color printer. Each recording sheet S fed from a paper feed tray 200 travels along a transport path P1 and arrives at a secondary transfer roller pair 201. At the secondary transfer roller pair 201, the recording sheet S receives statistical transfer of a toner image. Subsequently, the recording sheet S travels further along the transport path P1 and arrives at a fixing roller pair 202. At the fixing roller pair 202, the toner image on the recording sheet S is heat-fixed onto the recording sheet S.

As such, the recording sheet S fed from the paper feed tray 200 receives image forming while being transported substantially upwards in the vertical direction. Thus, the image forming device 1 requires smaller installation space compared to image forming devices in which recording sheets are transported in the horizontal direction. Further, in duplex printing, a recording sheet already bearing an image on a front side thereof travels along a transport path P2 before having an image also formed on a rear side thereof.

[2] Transport of Recording Sheets in Image Forming Device 1

In a typical in-body paper-ejection type image forming device, a vacant space exists within the in-body space, particularly above the post-processing unit. Arranging a reverse path for reversing recording sheets, a buffer unit for temporarily holding recording sheets, etc., within this vacant space makes effective use of the vacant space and consequently reduces image forming device size. In particular, arranging a reverse path, a buffer unit, and a post-processing unit in the stated order from up to down in the vertical direction allows arranging both the reversal path and the buffer unit within the vacant space, and consequently reduces image forming device size.

In the image forming device 1, a reverse path, a buffer unit, and a post-processing unit are arranged in the stated order from up to down in the vertical direction, and due to this, recording sheets are transported as follows in the image forming device 1.

(2-1) Transport of Recording Sheets When No Recording Sheet Stack Resides in Post-Processing Unit 100

The following describes transport of recording sheets when no recording sheet stack resides in the post-processing unit 100.

Figure 3:
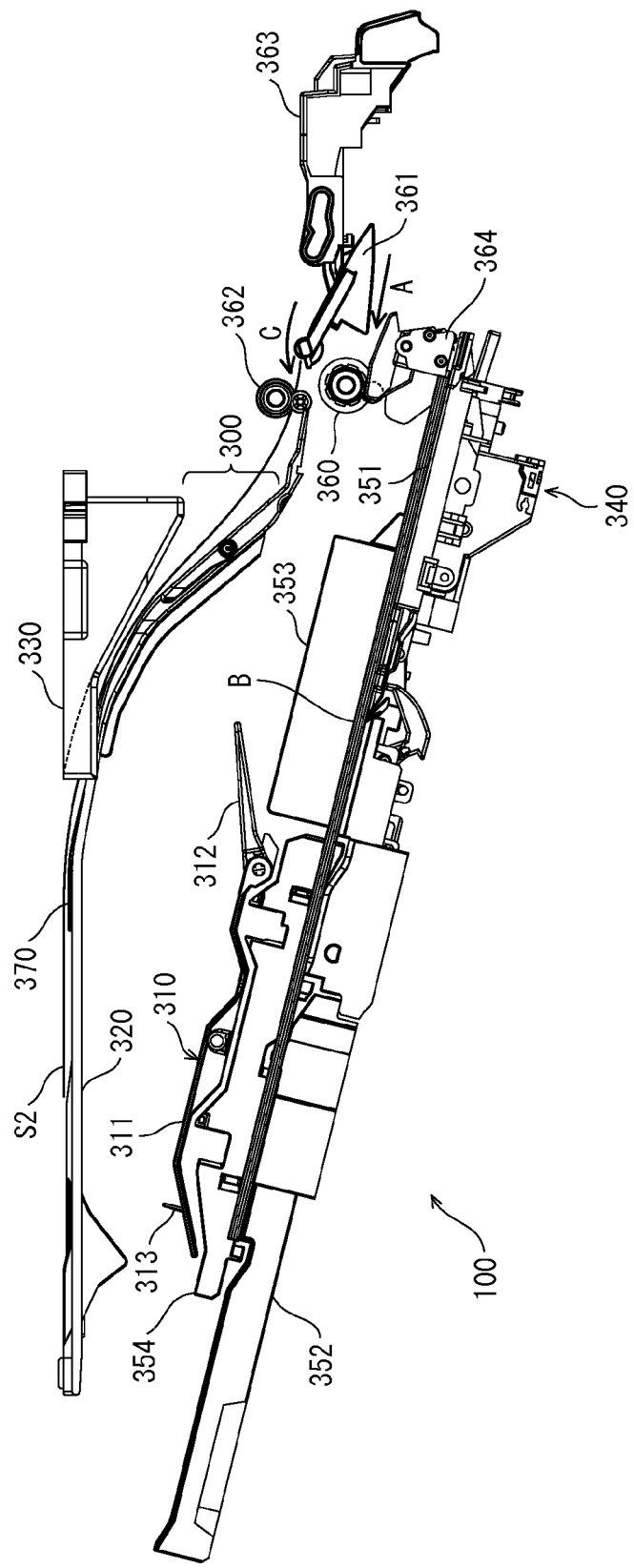
FIG. 3 is a front view illustrating major components within an in-body space 130.
Figure 4:
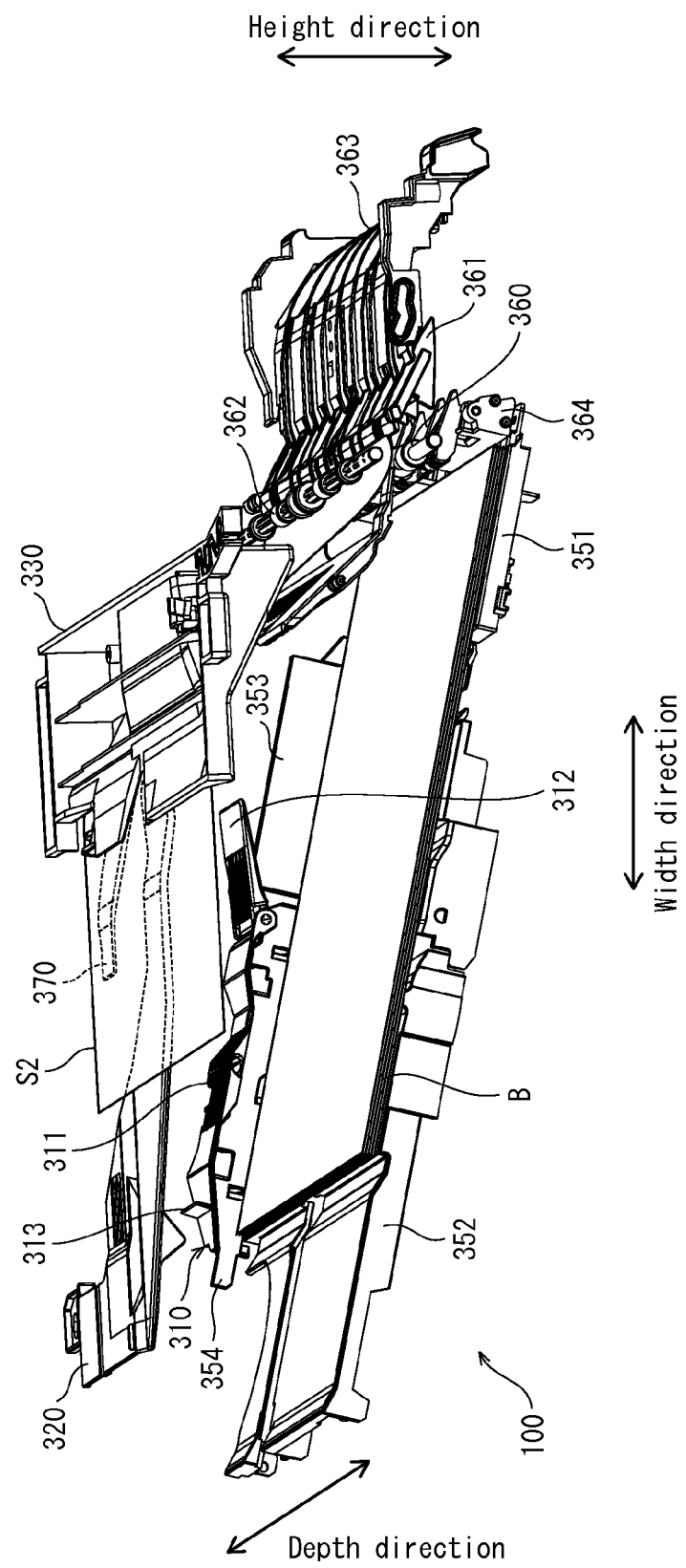
FIG. 4 is a perspective view illustrating the appearance of major components within the in-body space 130.

FIG. 3 is a front view illustrating major components within the in-body space 130, and FIG. 4 is a perspective view illustrating the appearance of such major components. When no recording sheet stack resides in the post-processing unit 100, a recording sheet output from the printer unit 110 is guided by guide claws 361 to travel in the direction indicated by arrow A in FIG. 3 towards an eject roller pair 360.

The eject roller pair 360 ejects the recording sheet onto a fixed tray 350 of the post-processing unit 100.

The guide claws 361 are pivotably supported by a shaft provided to the printer unit 110. The guide claws 361 are capable of guiding a recording sheet output from the printer unit 110 either towards the eject roller pair 360 (i.e., in the direction indicated by arrow A) or towards a reverse roller pair 362 (i.e., in the direction indicated by arrow C). Further, when the image forming device 1 performs duplex printing, the guide claws 361 are also capable of guiding a recording sheet whose transport direction has been reversed above a guide plate 363 to travel towards the transport path P2.

When a plurality of recording sheets composing a recording sheet stack B are ejected on the fixed tray 351, an alignment plate 353 puts the recording sheets in alignment with one another. Then, the recording sheet stack B is transported onto a pivoting tray 352, where the recording sheet stack B receives post-processing (e.g., stapling). Here, a sheet receiving surface of the fixed tray 351 and a sheet receiving surface of the pivoting tray 352 are substantially flush with one another, with the pivoting tray 352 being in an inclined state.

When the post-processing device 100 completes the post-processing, the pivoting tray 352 pivots so that the sheet receiving surface thereof becomes substantially horizontal. Accordingly, the pivoting tray 352 transitions to a horizontal state. After the pivot tray 352 transitions to the horizontal state, a pushing plate 354 pushes out the recording sheet stack B onto the front tray 111. Accordingly, the recording sheet stack B is ejected from the image forming device 1.

(2-2) Transport of Recording Sheets while Recording Sheet Stack Resides in Post-Processing Unit 100

Figure 5:
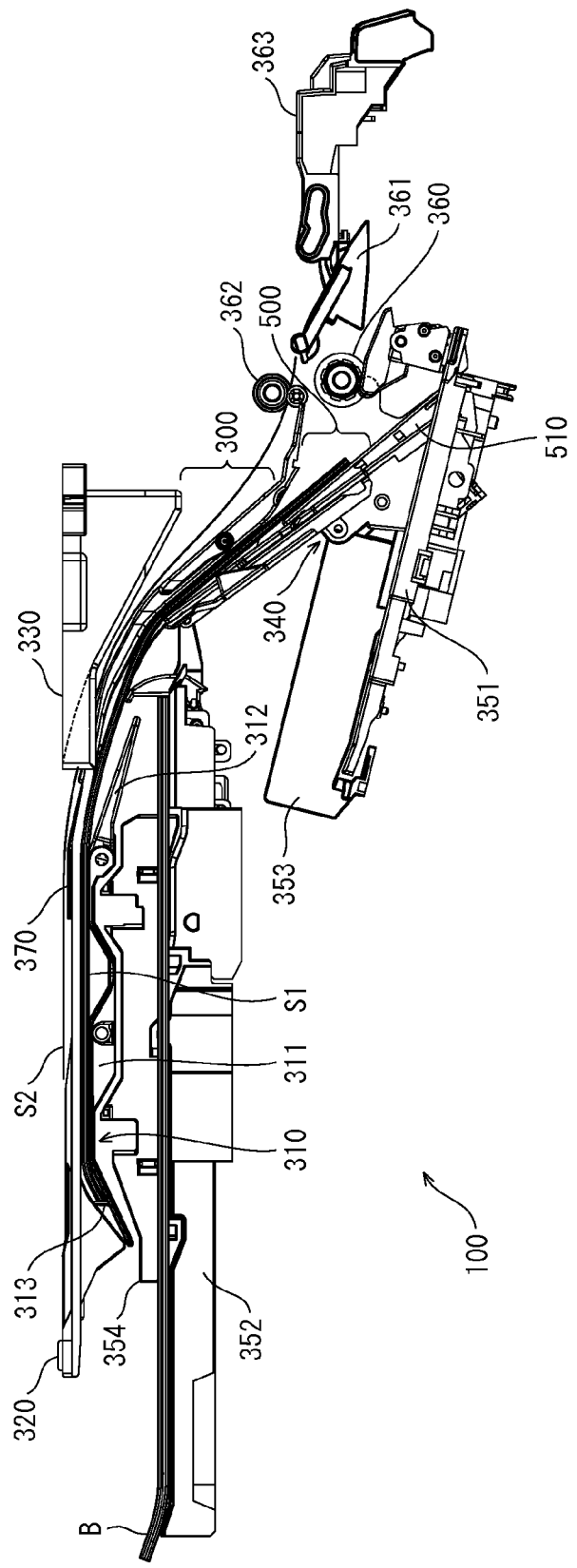
FIG. 5 is a front view illustrating the in-body space 130 when a pivoting tray 352 is in a horizontal state.

While the recording sheet stack B resides in the post-processing unit 100, a subsequent recording sheet S1 output from the printer unit 110 cannot be immediately ejected onto the fixed tray 351. Thus, the recording sheet S1 is transported to a buffer unit 500 to be temporarily held in the buffer unit 500, as illustrated in FIG. 5. Subsequently, the recording sheet S1 is transported from the buffer unit 500 onto the pivoting tray 352 when all processing by the post-processing unit 100 with respect to the recording sheet stack B is completed (i.e., when the recording sheet stack B is pushed out onto the front tray 111).

The buffer unit 500 is located above the post-processing unit 100. Further, in a plan view taken along the vertical direction, the buffer unit 500 at least partially covers the post-processing unit 100. Such an arrangement of the buffer unit 500 suppresses an increase in installation space that would otherwise occur when providing an image forming device with a buffer unit.

In addition, the buffer unit 500 holds the recording sheet S1 to rest flat thereon, and thus the buffer unit 500 has relatively small height. This suppresses an increase in height that would otherwise occur when providing an image forming device with a buffer unit.

Further in addition, in a plan view taken along the vertical direction, the buffer unit 500 also at least partially covers the paper feed tray 200. Such an arrangement of the buffer unit 500 also suppresses an increase in installation space that would otherwise occur when providing an image forming device with a buffer unit.

The buffer unit 500 is partitioned from the post-processing unit 100 by a combination of the front sliding guide member 510 described above, a rear sliding guide member 340, and a first partition guide plate 310. Further, the buffer unit 500 is partitioned from a reverse path 300 by a second partition guide plate 320.

<Front Sliding Guide Member 510>

Figure 7:
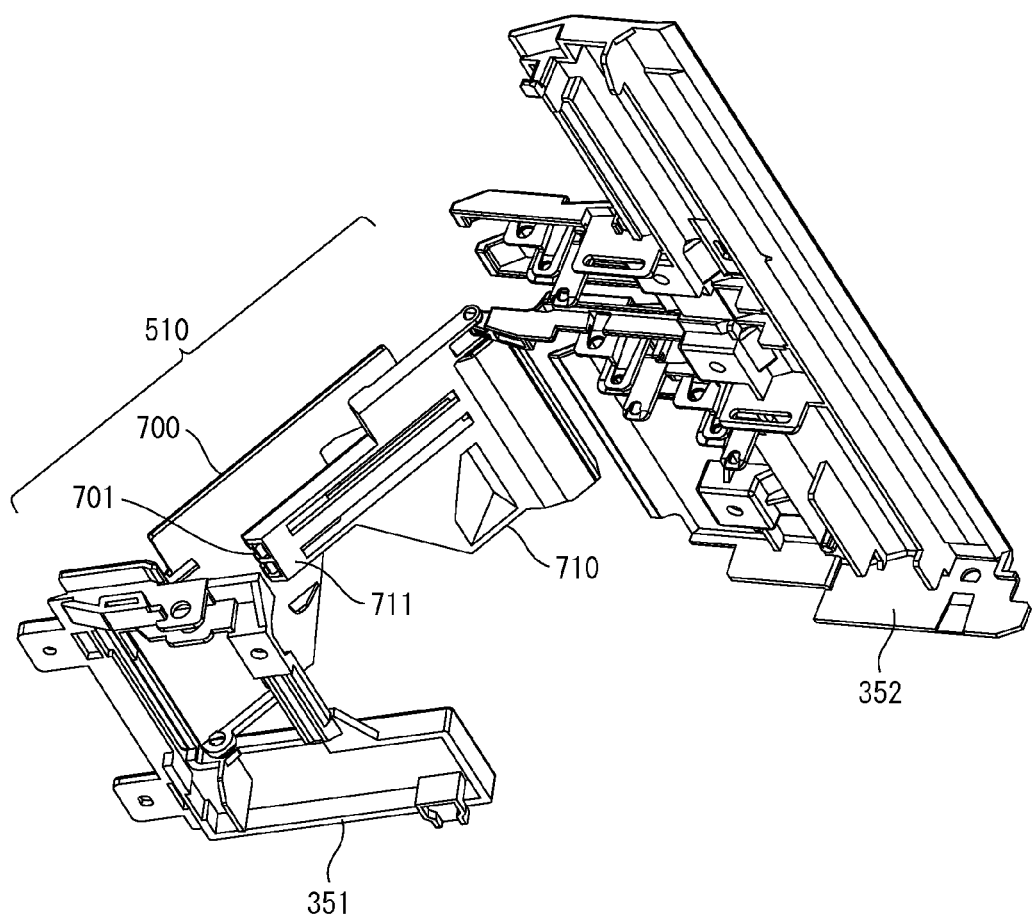
FIG. 7 is a perspective view illustrating the appearance of a front sliding guide member 510 with the viewpoint below and behind the front sliding guide member 510.

Along a direction connecting the front and rear sides of the image forming device 1 (i.e., the depth direction), the front sliding guide member 510 is located in front of the rear sliding guide member 340. FIG. 7 is a perspective view illustrating the appearance of the front sliding guide member 510 with the viewpoint below and behind the front sliding guide member 510. As illustrated in FIG. 7, the front sliding guide member 510 is composed of an upstream member 700 and a downstream member 710.

The upstream member 700 is located further upstream than the downstream member 710 along the sheet eject direction, and is pivotably supported by a shaft provided to the fixed tray 351. Further, the upstream member 700 has an engaging protrusion portion 701.

The downstream member 710 is located further downstream than the upstream member 700 along the sheet eject direction, and is pivotably supported by a shaft provided to the pivoting tray 352. The downstream member 710 has a rail portion 711. The rail portion 711 engages with the engaging protrusion portion 701. Due to the rail portion 711 and the engaging protrusion portion 701 being capable of sliding with respect to one another in engaged state, the front sliding guide member 510 is capable of lengthening and shortening Specifically, while the pivoting tray 352 is in the inclined state, the portion of the downstream member 710 connected to the shaft of the pivoting tray 352 is relatively close to the portion of the upstream member 700 connected to the shaft of the fixed tray 351. Thus, while the pivoting tray 352 is in the inclined state, the front sliding guide member 510 is in a shortened state.

Figure 8:
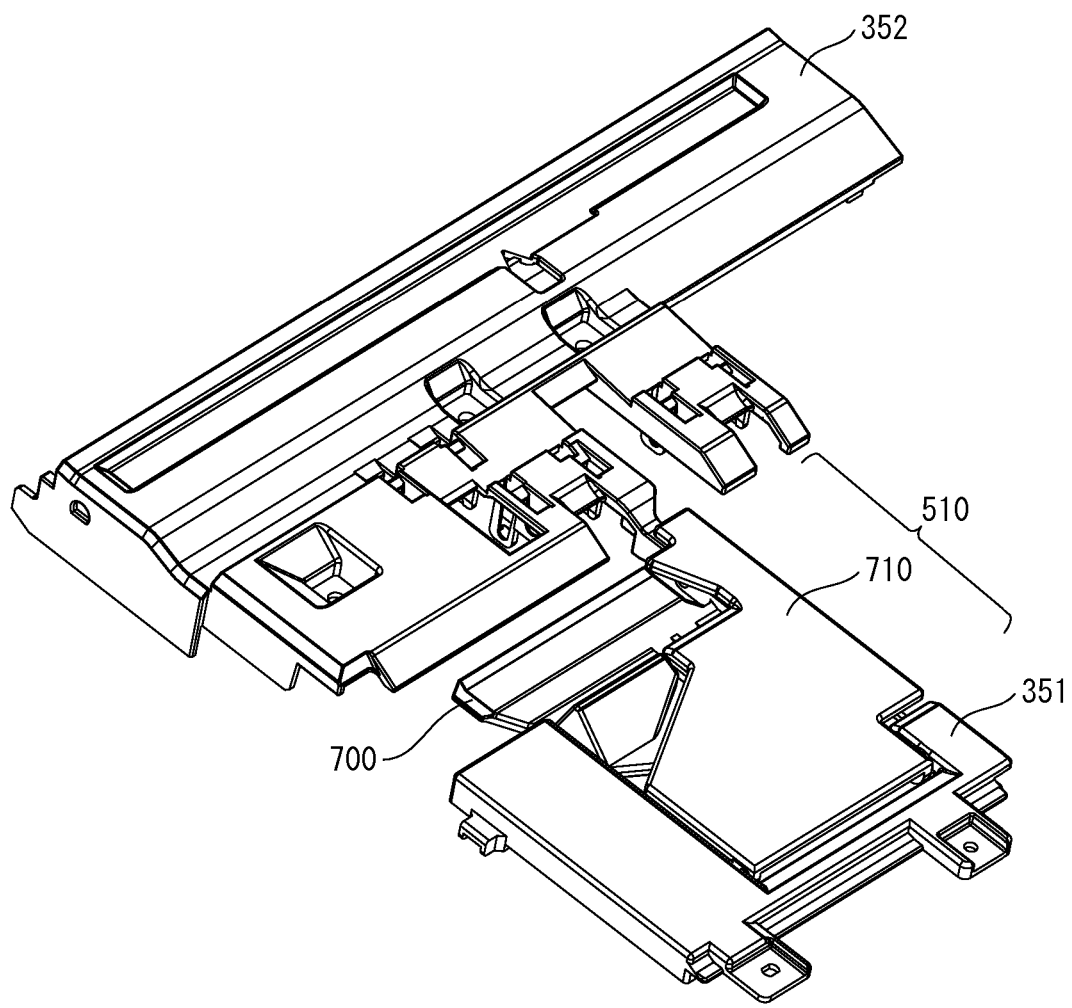
FIG. 8 is a perspective view illustrating the appearance of an upper part of the front sliding guide member 510.

Note that when the front sliding guide member 510 is in the shortened state, both the portion of the downstream member 710 connected to the shaft of the pivoting tray 352 and the portion of the upstream member 700 connected to the shaft of the fixed tray 351 are retracted into the fixed tray 351. That is, when in the shortened state, the entire front sliding guide member 510 is retracted into the fixed tray 351. Accordingly, when the front sliding guide member 510 is in the shortened state, a sheet receiving surface of the front sliding guide member 510 and the sheet receiving surface of the fixed tray 351 are substantially flush with one another, as illustrated in FIG. 8. The sheet receiving surface of the front sliding guide member 510 and the sheet receiving surface of the fixed tray 351 receive the recording sheet stack B in this state, as illustrated in FIGS. 3 and 4.

Figure 6:
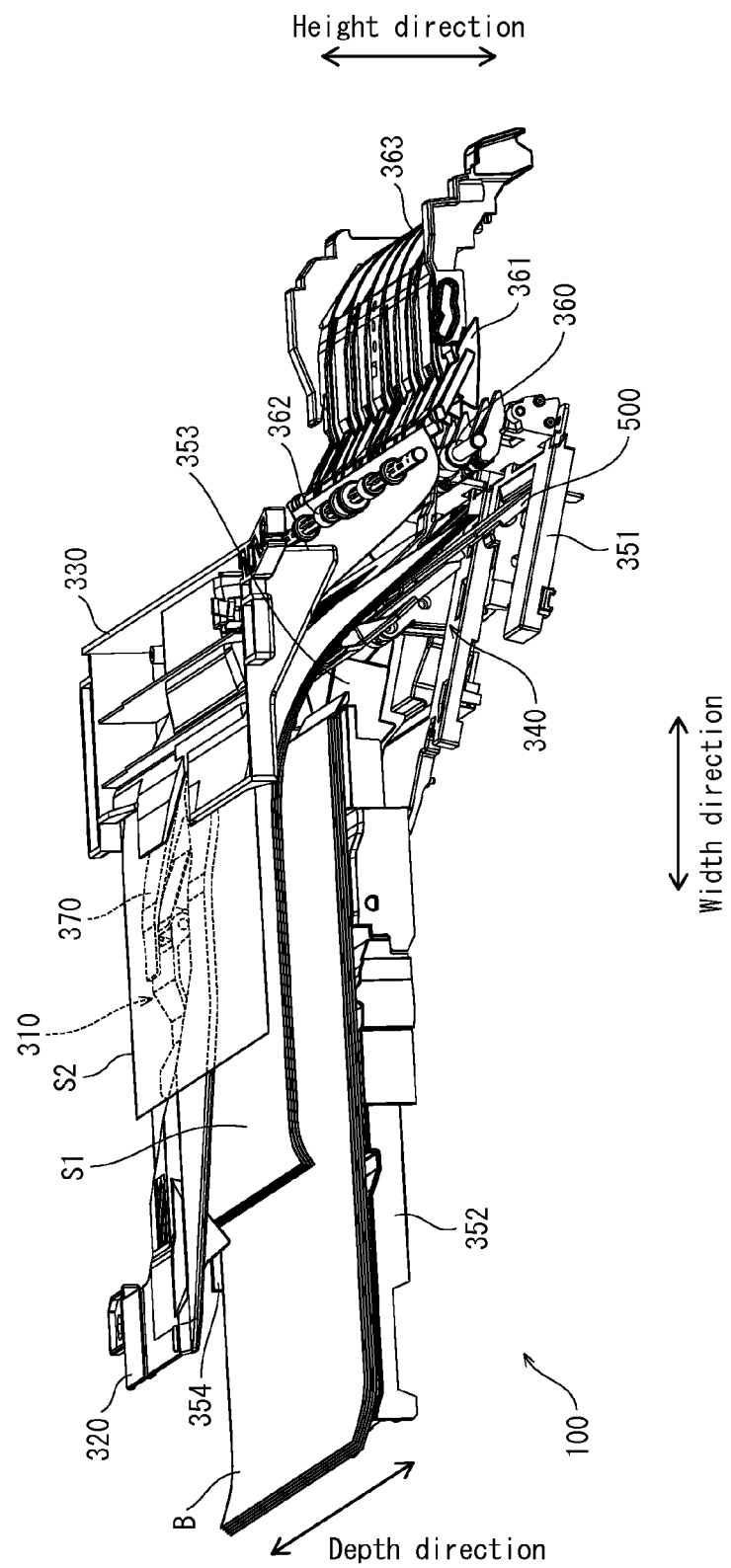
FIG. 6 is a perspective view illustrating the appearance of the in-body space 130 when the pivoting tray 352 is in the horizontal state.

Meanwhile, while the pivoting tray 352 is in the horizontal state, the portion of the downstream member 710 connected to the shaft of the pivoting tray 352 is relatively distant from the portion of the upstream member 700 connected to the shaft of the fixed tray 351. Thus, while the pivoting tray 352 is in the horizontal state, the front sliding guide member 510 is in a lengthened state, as illustrated in FIG. 7. The front sliding guide member 510, when in the lengthened state, guides the recording sheet S1 onto a sheet receiving surface of the first partition guide plate 310, as illustrated in FIGS. 5 and 6. Accordingly, the recording sheet S1 is guided further into the buffer unit 500.

Subsequently, when the recording sheet stack B placed on the pivoting tray 352 is pushed out onto the front tray 111 and the pivoting tray 352 then returns to the inclined state, the front sliding guide member 510 shortens and is retracted into the fixed tray 351.

<Rear Sliding Guide Member 340>

The rear sliding guide member 340 is pivotably supported by a shaft provided to the fixed tray 351. As illustrated in FIG. 9, the rear sliding guide member 340 includes a base portion 900 and a sliding plate 910. The sliding plate 910 is slidably held in the base portion 900.

Figure 9A:
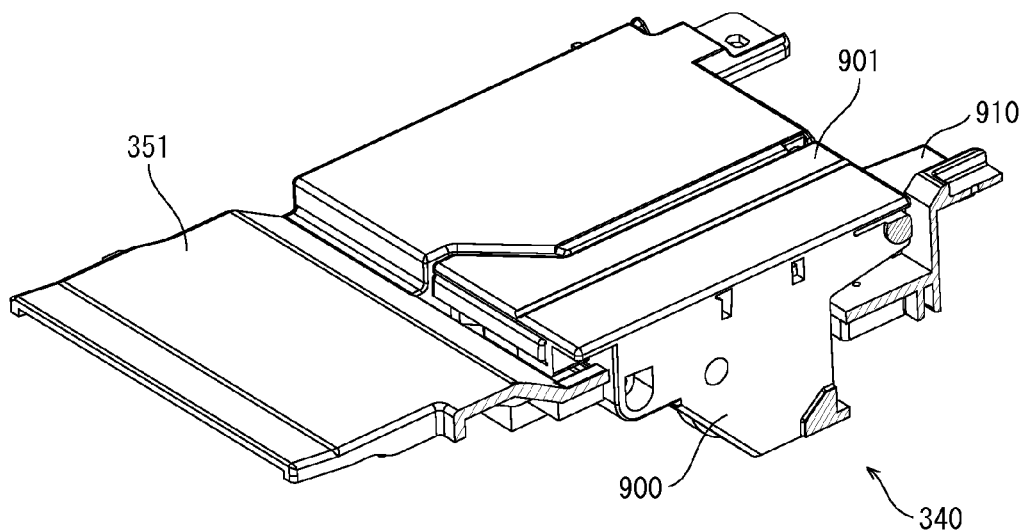
FIGS. 9A and 9B are perspective views illustrating the appearance of a rear sliding guide member 340, with FIG. 9A illustrating the position of the rear sliding guide member 340 in a normal state and FIG. 9B illustrating the position of the rear sliding guide member 340 during post-processing of a recording sheet stack.

While the pivoting tray 352 is in the inclined state, the sliding plate 910 is housed inside the base portion 900. Further, while the pivoting tray 352 is in the inclined state, the base portion 900 is retracted into the fixed tray 351, such that a sheet receiving surface 901 of the base portion 900 and the sheet stacking surface of the fixed tray 351 are substantially flush with one another, as illustrated in FIG. 9A. The sheet stacking surface 901 receives the recording sheet stack B in this state.

Figure 9B:
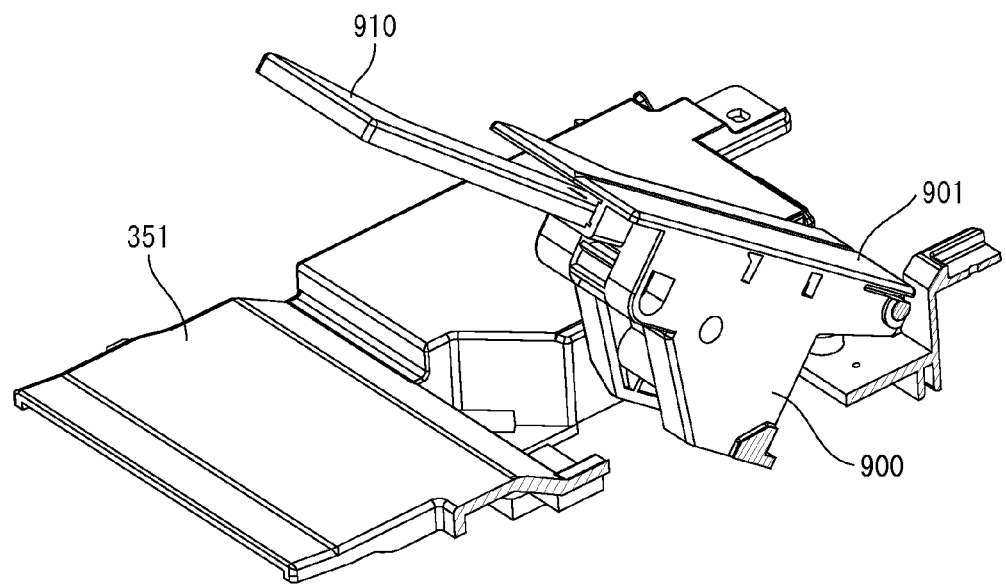

Subsequently, when alignment of the recording sheets in the recording sheet stack B is completed and the recording sheet stack B is then transported to a position for post-processing, the rear sliding guide member 340 is caused to pivot and spring upwards. When the rear sliding guide member 340 springs upwards, the sliding plate 910 juts out towards the first partition guide plate 310, as illustrated in FIG. 9B. This movement of the sliding plate 910 is achieved by an undepicted mechanism causing the sliding plate 910 to extend.

When the rear sliding guide member 340 springs upwards and the sliding plate 910 juts out towards the first partition guide plate 310 as described above, a sheet guiding surface of the sliding plate 910 and a sheet guiding surface of the front sliding guide member 510 become substantially flush with one another. The sliding plate 910 and the front sliding guide member 510 guide the recording sheet S1 onto the sheet receiving surface of the first partition guide plate 310 in this state. Accordingly, the recording sheet S1 is guided further into the buffer unit 500.

Subsequently, when the recording sheet stack B placed on the pivoting tray 352 is pushed out onto the front tray 111 and the pivoting tray 352 then returns to the inclined state, the sliding plate 910 is retracted to the inside of the base portion 900 and the base portion 900 is retracted into the fixed tray 351.

<First Partition Guide Plate 310>

The first partition guide plate 310 is driven by an undepicted actuator to move back and forth in the depth direction. Specifically, the first partition guide plate 310 advances to the front side of the image forming device 1 after the pivoting tray 352 has transitioned to the horizontal state. Following this, the first partition guide plate 310 retreats to the rear side of the image forming device 1 when the recording sheet stack B has been pushed out onto the front tray 111. The first partition guide plate 310 retreating in such a manner results in the recording sheet S1 being temporarily held in the buffer unit 500 falling onto the pivoting tray 352.

The first partition guide plate 310 includes a main body portion 311 and a pivoting portion 312.

The pivoting portion 312 is pivotably supported by a support shaft provided to an upstream end portion of the main portion 311 in the sheet eject direction. While the pivoting tray 352 is in the inclined state, the pivoting portion 312 is inclined upwards as illustrated in FIG. 3 to allow recording sheets to be placed onto the pivoting tray 352. Meanwhile, while the pivoting tray 352 is in the horizontal state, the pivoting portion 312 is inclined downwards as illustrated in FIG. 5 to guide the recording sheet S1 further into the buffer unit 500.

Further, the main body portion 311 has a stopper 313 provided at a downstream end portion thereof in the sheet eject direction. The stopper 313 comes in contact with a front end of the recording sheet S1 guided further inside the buffer unit 500, and prevents the recording sheet S1 from advancing any further downstream in the sheet eject direction. Note that forming the main body part 311 to integrally include the stopper 313 reduces the number of parts composing the image forming device 1, which results in a reduction in materials cost and a reduction in assembling procedures for manufacturing the image forming device 1.

<Downward Bias Member 370>

A downward bias member 370 applies a downward bias to the recording sheet S1 on the first partition guide plate 310 when the recording sheet S1 is caused to fall down on the pivoting tray 352. The downward bias member 370 forces the recording sheet S1 temporarily held in the buffer unit 500 to fall on the pivoting tray 352. Having fallen on the pivoting tray 352, the recording sheet S1 is pushed out onto the front tray 111 after receiving or without receiving post-processing by the post-processing unit 100.

(2-3) Transport of Recording Sheets in Sheet Reversal

The following explains the transport of a recording sheet when an image-forming target side of the recording sheet is reversed from one side to the other. Note that a reverse-target recording sheet is transported in the same manner regardless of whether or not the recording sheet stack B resides in the post-processing unit 100.

When reversing a recording sheet S2 output from the printer unit 110 and already bearing an image on a front side thereof, first, the guide claws 361 guide the recording sheet S2 to the reverse roller pair 362. The reverse roller pair 362 transports the recording sheet S2 onto the second partition guide plate 320. As already discussed above, the second partition guide plate 320 partitions the reverse path 300 from the buffer unit 500.

An upstream portion of the second partition guide plate 320 in the sheet ejection direction is covered by an upper cover 330. Where the upper cover 330 covers the second partition guide plate 320, the space between the upper cover 330 and the second partition guide plate 320 constitutes the reverse path 300.

The recording sheet S2, after being guided into the reverse path 300, comes to a temporarily halt with an upstream end portion thereof in the sheet ejection direction being sandwiched by the reverse roller pair 362. At this point, the transport direction of the recording sheet S2 is reversed, and subsequently, the recording sheet S2 travels towards the transport path P2. Here, to enable the recording sheet S2 to travel towards the transport path P2, the guide claws 361 guide the recording sheet S2 above the guide plate 363.

Following this, image forming is performed with respect to the rear side of the recording sheet S2, before the recording sheet S2 is ejected onto the fixed tray 350 in the same manner as when the image forming device 1 performs simplex printing.

The transport described above allows executing duplex printing regardless of whether or not the recording sheet stack B resides in the post-processing unit 100, and thus, prevents a decrease in productivity that would otherwise occur when performing duplex printing. In addition, the reverse path 300 at least partially covers each of the post-processing unit 100, the buffer unit 500, and the paper feed tray 200 in a plan view taken along the vertical direction. This suppresses an increase in installation space required for the image forming device 1 that would otherwise occur when providing an image forming device with the duplex printing function.

[3] Second Partition Guide Plate 320

In addition to the above, another factor contributing to the small size of the image forming device 1 is a cutaway portion provided to each of the front and rear sides of the second partition guide plate 320.

<Front Cutaway Portion 1000>

Figure 10:
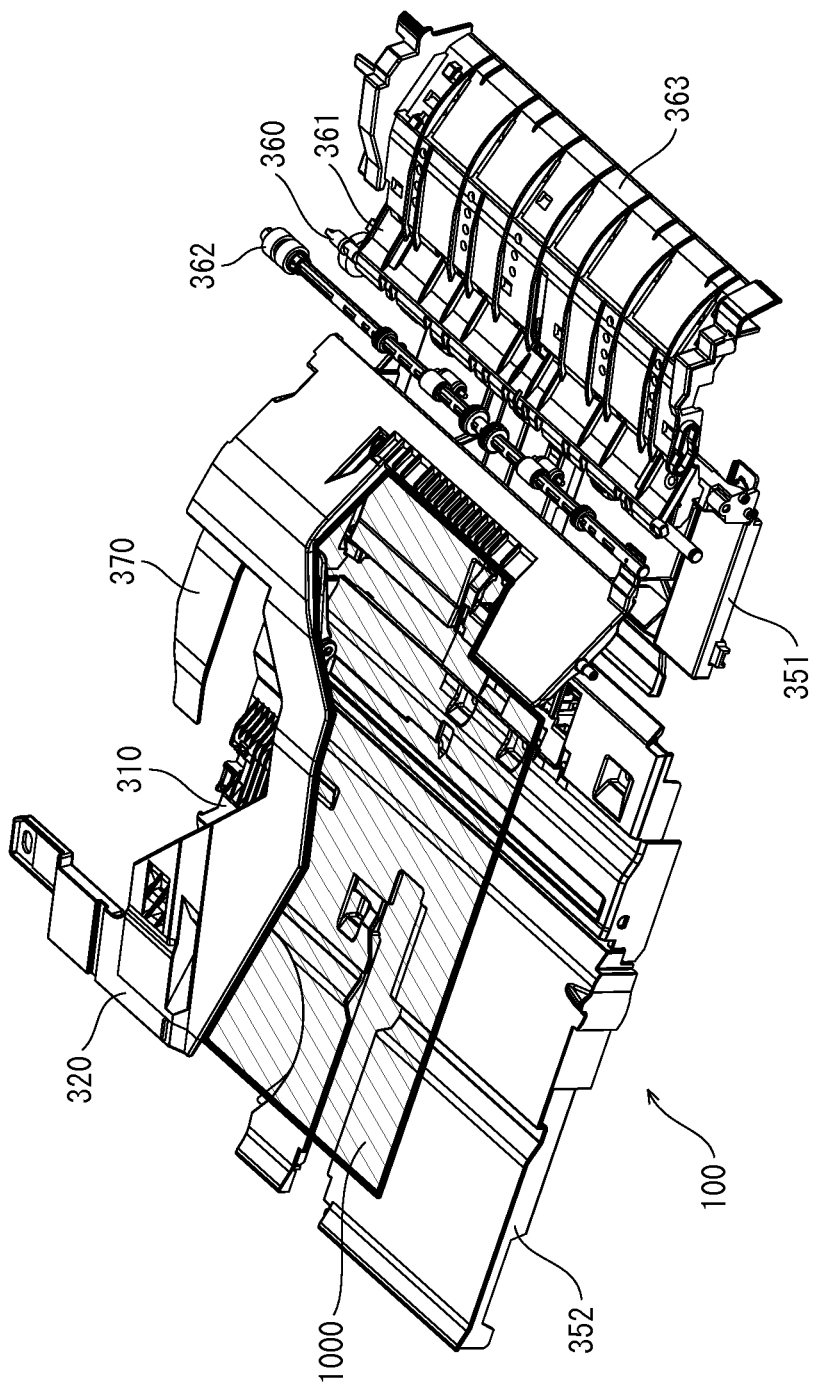
FIG. 10 is a perspective view illustrating a front cutaway portion 1000 of a second partition guide member 320.

The second partition guide plate 320 has a front cutaway portion 1000. As illustrated in FIG. 10, in a plan view of the second partition guide plate 320, the front cutaway portion 1000 is located at front side of second partition guide plate 320 and above the fixed tray 351, the pivoting tray 352, and the like.

The front cutaway portion 1000 exposes components therebelow (i.e., the fixed tray 350, the pivoting tray 352, and the like) to more light, and thus increases the visibility of the post-processing unit 100. Further, when a paper jam occurs inside the reverse path 300, the front cutaway portion 1000 enables access to the jammed paper, and thus achieves high removability of recording sheets in paper jams.

Further, the front cutaway 1000 may serve as a part of the reverse path 300 or as a part of the buffer unit 500, depending upon the situation. Providing the front cutaway portion 1000 improves space efficiency, since the height of each of the reverse path 300 and the buffer unit 500 can be reduced compared to when not providing the front cutaway portion 1000. This is because the front cutaway portion 1000 supplements the height of the reverse path 300 and the buffer unit 500.

<Rear Cutaway Portion 1100>

Figure 11:
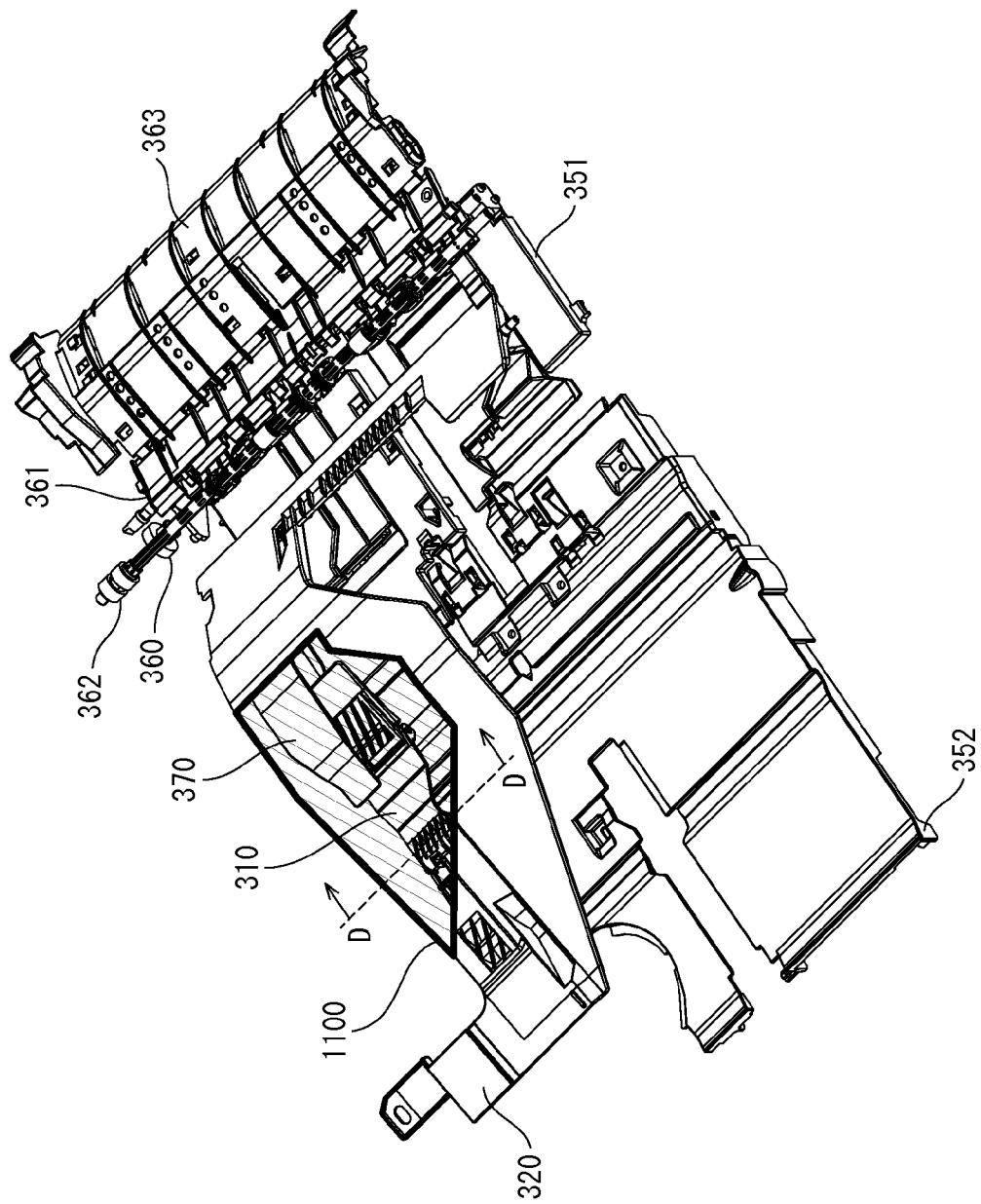
FIG. 11 is a perspective view illustrating a rear cutaway portion 1100 of the second partition guide plate 320.

The second partition guide plate 320 has a rear cutaway portion 1100. As illustrated in FIG. 11, in a plan view of the second partition guide plate 320, the rear cutaway portion 1100 is located at a rear side of the second partition guide plate 320 and above the downward bias member 370. Specifically, a downstream edge portion of the rear cutaway portion 1100, along a transport direction in which the recording sheet S2 is transported into and along the reverse path 300, obliquely intersects the transport direction to support the recording sheet S2 from below.

Figure 12:
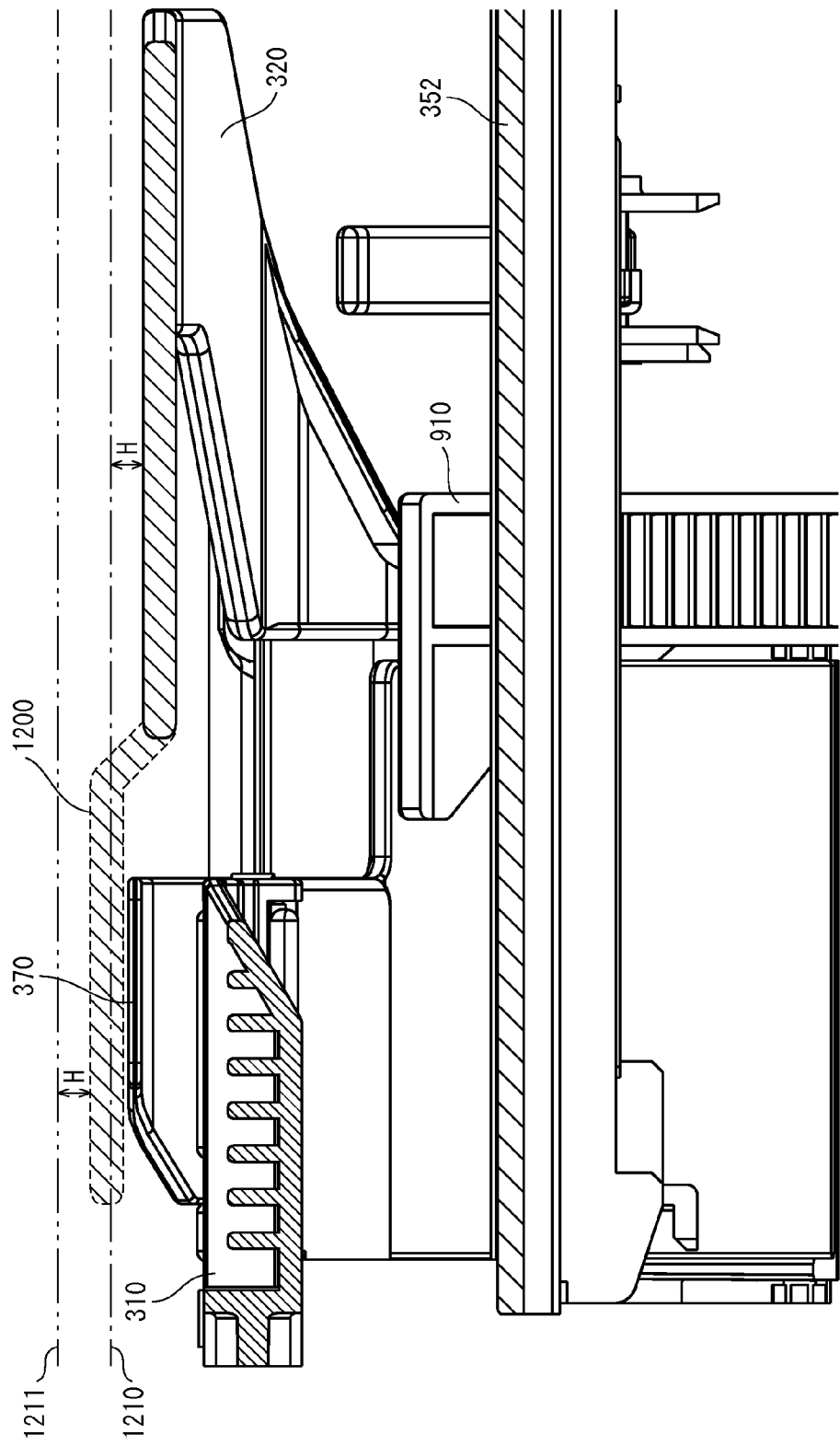
FIG. 12 is a perspective view illustrating a cross-section of the rear cutaway portion 1100 taken along line D-D in FIG. 11.
Figure 13:
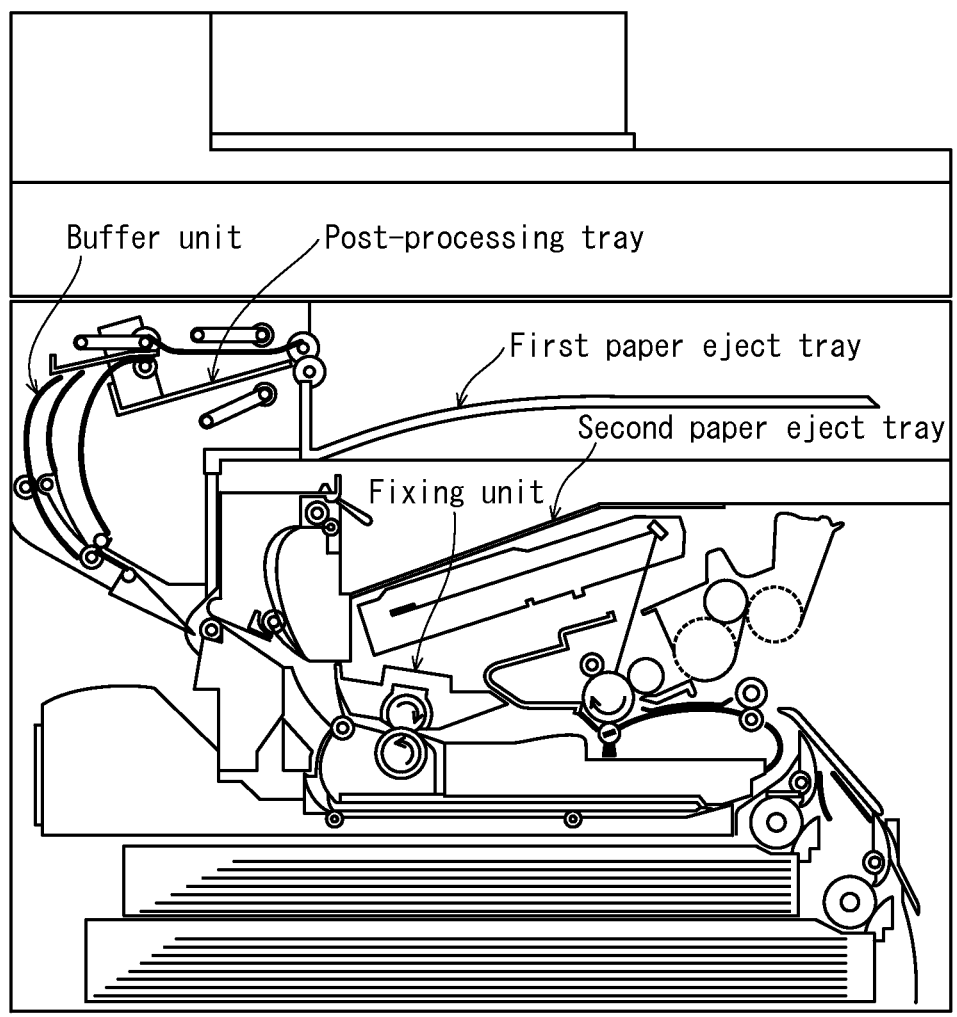
FIG. 13 illustrates the structure of an image forming device pertaining to conventional technology.

FIG. 12 is a perspective view illustrating a cross-section taken along line D-D in FIG. 11. As illustrated in FIG. 12, the downward bias member 370 is located higher than other components to ensure that the buffer unit 500 has a desirable height. However, extending the second partition guide plate 320 into a virtual area 1200 illustrated in FIG. 12 results in the second partition guide plate 320 being located higher than desirable.

Providing the reverse path 300 with a desirable height with the second partition guide plate 320 extending into the virtual area 1200 results in a bottom surface of the scanner unit 120 being located at a level 1211 illustrated in FIG. 12, due to the necessity of providing the space above the second partition guide plate 320 and below the bottom surface of the scanner unit 120 with a height H illustrated in FIG. 12. This results in the image forming device 1 having greater height than desirable.

Meanwhile, by providing the rear cutaway portion 1100 to the second partition guide plate 320, the second partition guide plate 320 can be arranged at a desirable height, and at the same time, the reverse path 300 can be provided with the desirable height even when the bottom portion of the scanner unit 120 is located at a level 1210 illustrated in FIG. 12 above the downward bias member 370. Accordingly, the rear cutaway portion 1100 suppresses an increase in the height of the image forming device 1 that would otherwise occur when providing the image forming device 1 with the reverse path 300.

[3] Modifications

Up to this point, description has been provided of the technology pertaining to the present disclosure based on one embodiment. However, the technology is not limited to the above embodiment, and modifications such as those described in the following may be made.

(1) In the embodiment, both the reverse path 300 and the buffer unit 500 are located within the in-body space 130. However, for example, a modification may be made of locating the reverse path 300 lower than the post-processing unit 100 in the vertical direction. This modification provides the image forming device 1 with smaller height while suppressing a decrease in productivity.

Alternatively, a modification may be made of arranging the post-processing unit 100, the buffer unit 500, and the reverse path 300 in the stated order from up to down in the vertical direction. When making this modification, the second partition guide plate 320, which serves as a partition between the buffer unit 500 and the reverse path 300, may still have one or more cutaway portions. As described above, providing such cutaway portions to the second partition guide plate 320 improves the visibility of the recording sheet S2 in the reverse path, and in addition, achieves high removability of recording sheets in paper jams.

(2) In the embodiment, the image forming device 1 includes the printer 110, which is a tandem-type color printer. However, for example, a modification may be made of using a printer other than a tandem-type printer as the printer 110. Further, using a black-and-white printer as the printer 110 similarly achieves the effects of the technology pertaining to the present disclosure.

CONCLUSION

As described up to this point, one aspect of the present disclosure is an image forming device having a printer unit, a post-processing unit, and an eject tray. The printer unit forms images on recording sheets, and the post-processing unit performs processing on a recoding sheet stack composed of one or more recording sheets output from the printer unit before the recording sheet stack is ejected onto the eject tray. The image forming device includes: a buffer unit that, while a first recording sheet resides in the post-processing unit for the post-processing, holds a second recording sheet therein, the second recording sheet output from the printer unit subsequent to the first recording sheet; and a reverse path that reverses recording sheets when the image forming device performs duplex printing. In a plan view of the image forming device taken along a vertical direction, the post-processing unit, the buffer unit, and the reverse path at least partially cover one another.

In the image forming device pertaining to one aspect of the present disclosure, in a plan view of the image forming device taken along a vertical direction, the post-processing unit, the buffer unit, and the reverse path at least partially cover one another. Thus, the image forming device pertaining to one aspect of the present disclosure requires small installation space.

Further, in the image forming device pertaining to one aspect of the present disclosure, even while a first recording sheet that belongs to one recording sheet set resides in the post-processing unit for post-processing, a subsequent second recording sheet that belongs to a different recording sheet set and that already bears an image can be temporarily stored in the buffer unit until the first recording sheet is ejected from the post-processing unit. In addition, when the image forming device pertaining to one aspect of the present invention performs duplex printing, a recording sheet that already bears an image on a front side thereof can be reversed through the reverse path so that image forming with respect to a rear side of the recording sheet is possible even while another recording sheet resides in the post-processing unit for post-processing. Accordingly, the image forming device pertaining to one aspect of the present disclosure is able to perform image forming with respect to a recording sheet belonging to one recording sheet set regardless of whether a previous recording sheet belonging to another recording sheet set resides in the post-processing unit for post-processing. Thus, the image forming device pertaining to one aspect of the present disclosure prevents a decrease in productivity that would otherwise occur when not configured as such.

In the image forming device pertaining to one aspect of the present disclosure, among the post-processing unit, the buffer unit, and the reverse path, the reverse path may be highest and the post-processing unit may be lowest in the vertical direction.

The image forming device pertaining to one aspect of the present disclosure may further include a scanner unit that is located higher than the printer unit in the vertical direction, the image forming device pertaining to one aspect of the present disclosure may have an in-body space between the scanner unit and the printer unit, and in the image forming device pertaining to one aspect of the present disclosure, the in-body space may accommodate the reverse path, the buffer unit, and the post-processing unit.

In the image forming device pertaining to one aspect of the present disclosure, the printer unit may form an image on a recording sheet while transporting the recording sheet substantially upwards in the vertical direction.

The image forming device pertaining to one aspect of the present disclosure may further include a paper feed tray that accommodates a recording sheet before image forming, and in the image forming device pertaining to one aspect of the present disclosure, in the plan view in the vertical direction, the paper feed tray, the post-processing unit, the buffer unit, and the reverse path may at least partially cover one another.

In the image forming device pertaining to one aspect of the present disclosure, the eject tray may be disposed at a front side of the image forming device.

The image forming device pertaining to one aspect of the present disclosure may further include a first guide plate that serves as a partition between the reverse path and the buffer unit, and in the image forming device pertaining to one aspect of the present disclosure, the first guide plate may have a cutaway portion exposing a recording sheet travelling along the reverse path.

When the image forming device pertaining to one aspect of the present disclosure includes the first guide plate as described above, a downstream edge of the cutaway portion, along a transport direction in which the recording sheet travelling along the reverse path advances, may obliquely intersect the transport direction to support from below the recording sheet travelling along the reverse path.

The image forming device pertaining to one aspect of the present disclosure may further include: a second guide plate that, while the first recording sheet resides in the post-processing unit, serves as a part of the buffer unit and partitions the buffer unit from the post-processing unit; and a driver that drives the second guide plate to slide and transfer the second recording sheet to the post-processing unit, and in the image forming device pertaining to one aspect of the present disclosure, the second guide plate and the first guide plate may define two opposites sides of the buffer unit, and the second guide plate may have a stopper that comes in contact with a front end of the second recording sheet to restrict the second recording sheet from advancing any further in the buffer unit.

Although the technology pertaining to the present disclosure has been fully described by way of examples with reference to the accompanying drawings, it is to be noted that various changes and modifications will be apparent to those skilled in the art.

Therefore, unless otherwise such changes and modifications depart from the scope of the technology pertaining to the present disclosure, they should be construed as being included therein.

What is claimed is:

1. An image forming device having a printer unit, a post-processing unit, and an eject tray, wherein the printer unit forms images on recording sheets, and the post-processing unit performs processing on a recoding sheet stack composed of one or more recording sheets output from the printer unit before the recording sheet stack is ejected onto the eject tray, the image forming device comprising:
   a buffer unit that, while a first recording sheet resides in the post-processing unit for the post-processing, holds a second recording sheet therein, the second recording sheet output from the printer unit subsequent to the first recording sheet; and
   a reverse path that reverses recording sheets when the image forming device performs duplex printing,
   wherein in a plan view of the image forming device taken along a vertical direction, the post-processing unit, the buffer unit, and the reverse path at least partially cover one another,
   the image forming device further comprising:
   a first guide plate that serves as a partition between the reverse path and the buffer unit;
   a second guide plate that serves as a partition between the post-processing unit and the buffer unit, while the first recording sheet resides in the post-processing unit, the second guide plate being opposite to the first guide plate over the buffer unit; and
   a driver that drives the second guide plate to slide and transfer the second recording sheet to the post-processing unit.

2. The image forming device of claim 1, wherein among the post-processing unit, the buffer unit, and the reverse path, the reverse path is highest and the post-processing unit is lowest in the vertical direction.

3. The image forming device of claim 1 further comprising
   a scanner unit that is located higher than the printer unit in the vertical direction, wherein
   the image forming device has an in-body space between the scanner unit and the printer unit, and
   the in-body space accommodates the reverse path, the buffer unit, and the post-processing unit.

4. The image forming device of claim 1, wherein the printer unit forms an image on a recording sheet while transporting the recording sheet substantially upwards in the vertical direction.

5. The image forming device of claim 1 further comprising
   a paper feed tray that accommodates a recording sheet before image forming, wherein
   in the plan view in the vertical direction, the paper feed tray, the post-processing unit, the buffer unit, and the reverse path at least partially cover one another.

6. The image forming device of claim 1, wherein the eject tray is disposed at a front side of the image forming device.

7. The image forming device of claim 1, wherein the first guide plate has a cutaway portion exposing a recording sheet travelling along the reverse path.

8. The image forming device of claim 7, wherein
   a downstream edge of the cutaway portion, along a transport direction in which the recording sheet travelling along the reverse path advances, obliquely intersects the transport direction to support from below the recording sheet travelling along the reverse path.

9. The image forming device of claim 1, wherein the second guide plate has a stopper that comes in contact with a front end of the second recording sheet to restrict the second recording sheet from advancing any further in the buffer unit.

10. An image forming device having a printer unit, a post-processing unit, and an eject tray, wherein the printer unit forms images on recording sheets, and the post-processing unit performs processing on a recoding sheet stack composed of one or more recording sheets output from the printer unit before the recording sheet stack is ejected onto the eject tray, the image forming device comprising:

a buffer unit that, while a first recording sheet resides in the post-processing unit for the post-processing, holds a second recording sheet therein, the second recording sheet output from the printer unit subsequent to the first recording sheet;

a reverse path that reverses recording sheets when the image forming device performs duplex printing; and a first guide plate that serves as a partition between the reverse path and the buffer unit, wherein in a plan view of the image forming device taken along a vertical direction, the post-processing unit, the buffer unit, and the reverse path at least partially cover one another, and the first guide plate has a cutaway portion exposing a recording sheet travelling along the reverse path.

11. The image forming device of claim 10, wherein a downstream edge of the cutaway portion, along a transport direction in which the recording sheet travelling along the reverse path advances, obliquely intersects the transport direction to support from below the recording sheet travelling along the reverse path.

12. The image forming device of claim 10 further comprising:

a second guide plate that, while the first recording sheet resides in the post-processing unit, serves as a part of the buffer unit and partitions the buffer unit from the post-processing unit; and a driver that drives the second guide plate to slide and transfer the second recording sheet to the post-processing unit, wherein the second guide plate and the first guide plate define two opposite sides of the buffer unit, and the second guide plate has a stopper that comes in contact with a front end of the second recording sheet to restrict the second recording sheet from advancing any further in the buffer unit.

\* \* \* \* \*